United States Patent
Eickhoff

(10) Patent No.: US 8,272,397 B2
(45) Date of Patent: *Sep. 25, 2012

(54) VALVE FOR FUEL CELL BASED POWER GENERATOR

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 708 days.

This patent is subject to a terminal disclaimer.

(21) Appl. No.: 12/194,487

(22) Filed: Aug. 19, 2008

(65) Prior Publication Data

US 2010/0043892 A1 Feb. 25, 2010

(51) Int. Cl.
*F16K 31/12* (2006.01)
*F16K 31/36* (2006.01)

(52) U.S. Cl. ...................................... 137/505

(58) Field of Classification Search ............ 137/505.13, 137/505, 494, 332; 251/332; 4/223, 224, 4/415; 429/515, 443, 454, 462, 512, 513
See application file for complete search history.

(56) References Cited

U.S. PATENT DOCUMENTS

| | | | |
|---|---|---|---|
| 3,765,946 A | 10/1973 | Werner et al. | |
| 3,994,697 A | 11/1976 | Burke | |
| 4,138,089 A | 2/1979 | McCarthy | |
| 4,155,712 A | 5/1979 | Taschek | |
| 4,261,955 A | 4/1981 | Bailey, Jr. et al. | |
| 5,346,777 A | 9/1994 | Namba et al. | |
| 5,372,617 A | 12/1994 | Kerrebrock et al. | |
| 5,853,910 A | 12/1998 | Tomioka et al. | |
| 5,914,200 A | 6/1999 | Schabert et al. | |
| 6,093,501 A | 7/2000 | Werth | |
| 6,303,244 B1 | 10/2001 | Surampudi et al. | |
| 6,432,566 B1 | 8/2002 | Condit et al. | |
| 6,562,127 B1 | 5/2003 | Kud et al. | |
| 7,192,665 B2 * | 3/2007 | Nakajima et al. | 429/444 |
| 2004/0052723 A1 | 3/2004 | Jorgensen | |
| 2004/0161646 A1 * | 8/2004 | Rezachek et al. | 429/19 |
| 2004/0209133 A1 | 10/2004 | Hirsch et al. | |
| 2005/0022883 A1 | 2/2005 | Adams et al. | |

(Continued)

FOREIGN PATENT DOCUMENTS

EP 1469545 A2 10/2004

(Continued)

OTHER PUBLICATIONS

U.S. Appl. No. 11/606,758, Response to Restriction Requirement filed Feb. 7, 2008 to Restriction Requirement mailed Jan. 7, 2008., 6.

(Continued)

*Primary Examiner* — Dinh Q Nguyen
*Assistant Examiner* — Chee-Chong Lee
(74) *Attorney, Agent, or Firm* — Schwegmen, Lundberg & Woessner, P.A.

(57) ABSTRACT

A device has an annulus having a first end and a second end. A valve plate is coupled to the first end of the annulus by a fastener, wherein the valve plate is adapted to contact a valve seat on a hydrogen producing fuel cover. A diaphragm is coupled to the second end of the annulus by a fastener, wherein the annulus extends through a container for holding the hydrogen producing fuel and wherein the diaphragm moves the valve plate relative to the valve seat responsive to a different in pressure across the diaphragm.

20 Claims, 6 Drawing Sheets

U.S. PATENT DOCUMENTS

| | | |
|---|---|---|
| 2005/0079128 A1 | 4/2005 | DeVos et al. |
| 2005/0118469 A1 | 6/2005 | Leach et al. |
| 2005/0136300 A1 | 6/2005 | Dyer |
| 2006/0127722 A1 | 6/2006 | Nakajima et al. |
| 2006/0174952 A1 | 8/2006 | Curello |
| 2007/0056634 A1* | 3/2007 | Yokoi et al. ............... 137/505.29 |
| 2007/0104996 A1* | 5/2007 | Eickhoff et al. ................. 429/34 |
| 2007/0160887 A1* | 7/2007 | Eickhoff .......................... 429/32 |
| 2007/0184312 A1 | 8/2007 | Eickhoff |
| 2008/0014473 A1* | 1/2008 | Nakakubo ....................... 429/13 |
| 2009/0252670 A1* | 10/2009 | Eickhoff et al. ........... 423/648.1 |

FOREIGN PATENT DOCUMENTS

| | | |
|---|---|---|
| WO | WO-2004075375 A2 | 9/2004 |
| WO | WO-2005/004273 A2 | 1/2005 |
| WO | WO-2006113469 A1 | 10/2006 |

OTHER PUBLICATIONS

"U.S. Appl. No. 11/606,759, Response filed Aug. 12, 2008 to Non-Final Office Action mailed May 12, 2008", 11.

"PCT Application No. PCT/US2007/085766, International Search Report mailed Apr. 2, 2008", 4 pgs.

"PCT Application No. PCT/US2007/085766, Written Opinion mailed Apr. 2, 2008", 6 pgs.

"U.S. Appl. No. 11/606,758, Non-Final Office Action Mailed May 12, 2008", 3.

Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California, (Nov. 13-20, 2004), 1-9.

* cited by examiner

VALVE FOR FUEL CELL BASED POWER GENERATOR

RELATED APPLICATIONS

This application is related to the following two applications filed on the same date herewith: Fuel Cell Based Power Generator (Applicant Reference Number: H0019541) and Method of Manufacturing Fuel Cell Based Power Generator (Applicant Reference Number: H0020226).

BACKGROUND

Proton exchange membrane (PEM) fuel cells use a simple chemical reaction to combine hydrogen and oxygen into water, producing electric current in the process. Hydrogen may be produced by a chemical reaction between a fuel, such as lithium aluminum hydride and water vapor. At an anode, hydrogen molecules are ionized by a platinum catalyst, and give up electrons. The PEM allows protons to flow through, but not electrons. As a result, hydrogen ions flow through the PEM to a cathode, while electrons flow through an external circuit. As the electrons travel through the external circuit, they can perform useful work by powering an electrical device such as an electric motor, light bulb or electronic circuitry. At the cathode, the electrons and hydrogen ions combine with oxygen to form water. The byproducts of the reaction are water and heat.

In some prior PEM fuel cell based power generator, a pneumatic valve is used to control a hydrogen generating chemical reaction that feeds hydrogen oxygen PEM fuel cells. The valve comprises a substantial portion of the power generator volume and weight, and thus reduces the energy density and specific energy of the power generator.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Various embodiments of a PEM fuel cell based power generator of various shapes are described. In one embodiment, the power generator is formed with the shape of a CR2032 battery, which is commonly used in watches, sensors and other electronic equipment. Such reduced height form factor may be achieved by one or more of several innovative features described herein.

Figure 1:
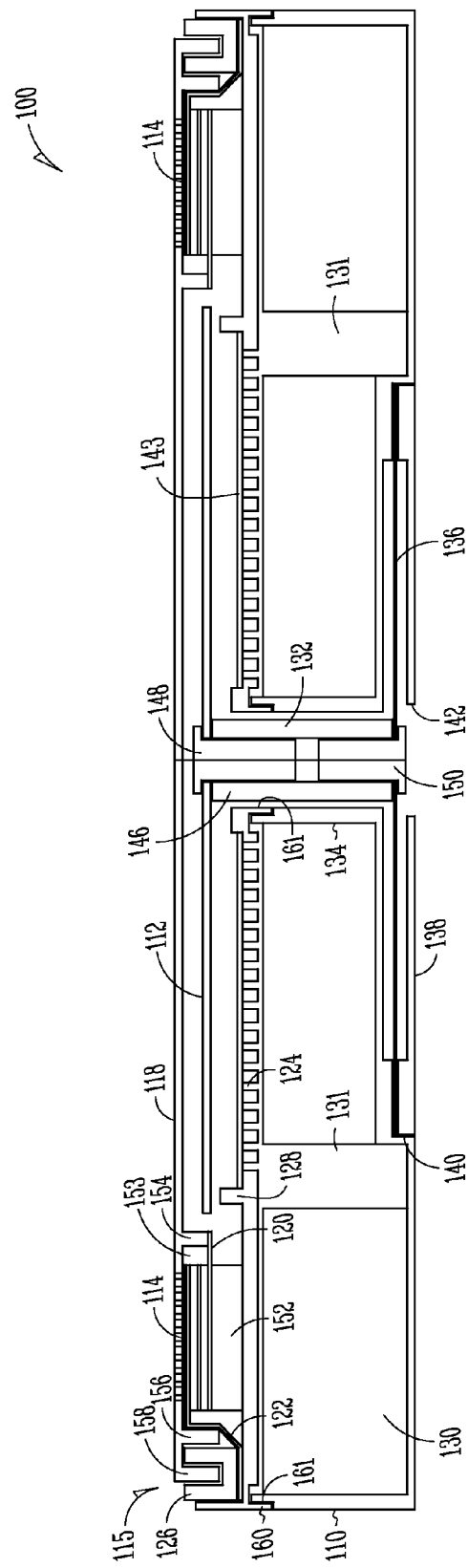
FIG. 1 is a block diagram of a power generator according to an example embodiment.
Figure 2:
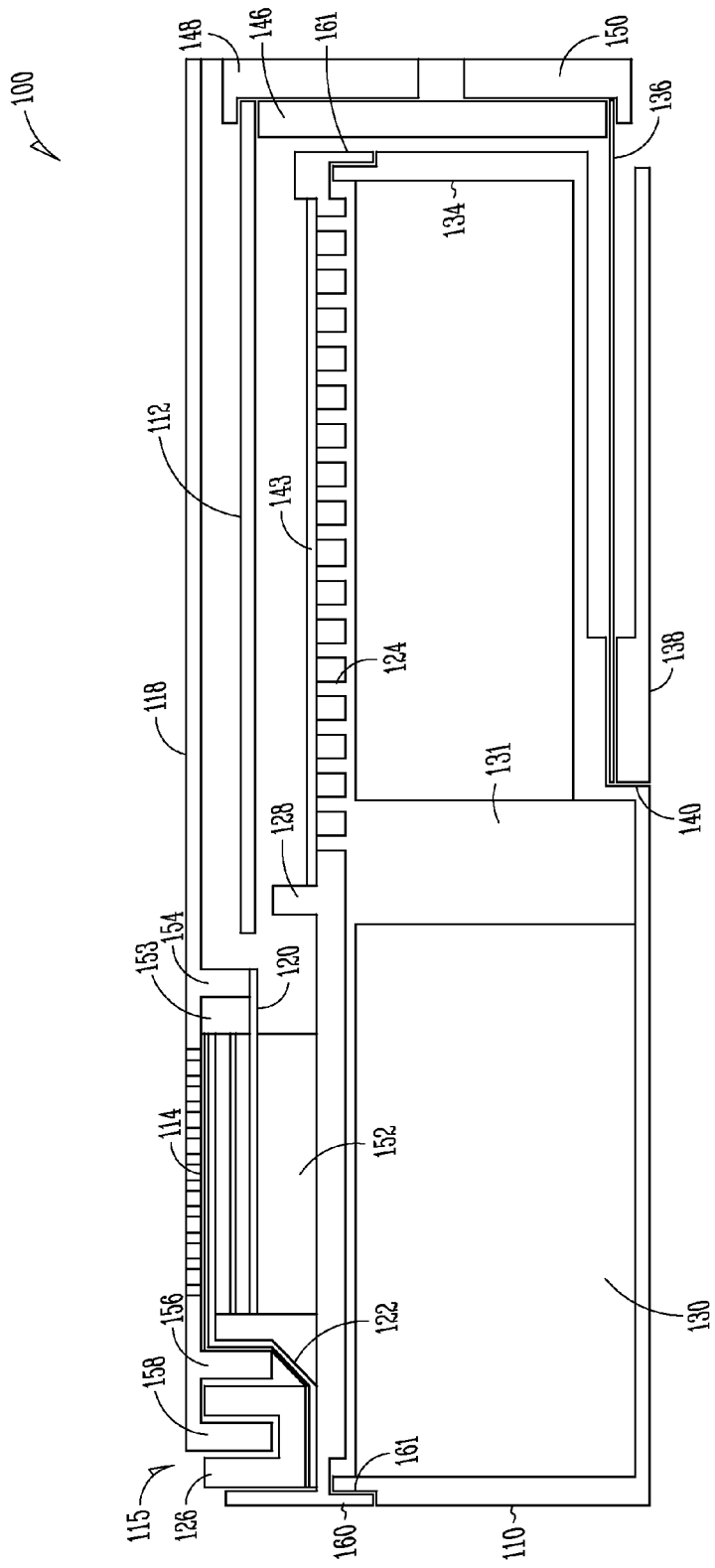
FIG. 2 is an enlarged block diagram of a portion of the power generator of FIG. 1.

FIG. 1 is a cross section block diagram of a power generator 100 according to an example embodiment. FIG. 2, is a blown up cross section block diagram view of one side of the power generator 100, with numbering consistent with FIG. 1. Power generator 100 has a container 110 adapted to hold a hydrogen generating fuel. The container may be cylindrical or rectangular in shape. Many other shapes, such as other polygons may be used as desired. A valve assembly having a valve plate 112 has a border that fits within a border of the container 110. A fuel cell 114, having multiple segmented fuel cells connected in series as described in further detail below, is laterally disposed outside and around the valve assembly. The fuel cell 114 has a lateral width that fits within the border of the container 110. A cover indicated generally at 115 is adapted to mate with the container 110 and enclose the valve plate 112 and fuel cell 114. Many of the components of power generator 100 may be formed of stainless steel 316, or nickel plated steel. Other materials may also be used in further embodiments that provide suitable conductive, corrosion resistant and structural properties.

In one embodiment, the fuel cell is ring shaped, with multiple fuel cells electrically coupled with one another. In one embodiment, the fuel cell comprises five arc shaped fuel cells, referred to as fuel cell segments, serially coupled to form a full circular fuel cell. Other shaped fuel cells may be used with different power generator shapes in further embodiments, such as a straight or angled segments for polygon shaped power generators. Each fuel cell segment in one embodiment produces approximately 0.6 V under load, for a total of 3V. The fuel cell has multiple layers extending radially from outside the valve plate 112. Fuel cell 114 in one embodiment is a proton exchange membrane (PEM) type of fuel cell.

In one embodiment, a portion of the cover 115 is electrically coupled to the fuel cell 114 to form an anode cap 118 via an anode tab 120, and the container 110 is electrically coupled to the fuel cell 114 to form a cathode via a cathode tab 122, which may be adhesive backed in one embodiment. Cover 115 in one embodiment comprises anode cap 118 coupled to a fuel cap 124. The anode cap 118 and fuel cap are electrically insulated from each other by an insert 126. In one embodiment, the insert 126 may be formed of PET (polyethylene terephthalate). Other electrically insulative materials may also be used in further embodiments.

In one embodiment, the power generator 100 container 110 and cover 115 when assembled define a low height cylindrical exterior of the power generator and have dimensions compatible with a CR2032 battery form factor having an outer diameter of approximately 20 mm and height of approximately 3.2 mm. The anode cap diameter is approximately 16.5 mm in this embodiment. The power generator 100 may be formed with many other dimensions. Power generator 100 is well suited to lower height designs due to the ability to form both the valve plate and fuel cell in a similar planar region above the fuel container 110 defined by the cover 115. The term, "diameter" refers to the distance between opposing borders, and may be used for cylinders or power generators of other shapes.

In one embodiment, the fuel cap 124 has a valve seat 128 positioned laterally inside the fuel cell 114 and formed to mate with the valve plate 112 to regulate flow of water vapor generated by the fuel cell 114 to fuel 130 contained within the container 110. PTFE (Polytetrafluoro ethylene) or other suitable material may be used at the interface between the valve seat 128 and valve plate 112 to prevent stiction and to provide a better seal.

In one embodiment, the valve assembly includes a valve stem assembly 132 coupled to the valve plate 112 at a first end, extending through an opening in the fuel container 110 defined by a side wall 134. The valve stem assembly 132 is coupled to a diaphragm 136 at a second end. The diaphragm 136 is retentively coupled to the fuel container by a diaphragm support 138 fastened to the container within a recess of the container indicated at 140. The use of such a recess provides a fairly flat bottom of the container, which in some embodiments may be consistent with a CR2032 form factor battery. In one embodiment, the diaphragm support 138 is electrically coupled to the container 110 and also serves as part of the cathode. The diaphragm support 138 has an opening 142 proximate the diaphragm 136 such that a difference in pressure across the diaphragm 136 controls the position of valve plate 112. In one embodiment, a bottom end of the valve stem assembly 132 is recessed within the recess 140 such that motion of the diaphragm will not result in movement of the bottom of the valve stem assembly beyond the bottom of the container 110.

The use of a recess 140 for the diaphragm 136, combined with the use of a diaphragm 136 having a smaller border than the fuel container 110, allows for more fuel to be contained within container 110 than in fuel cells having larger diaphragms. The border of the diaphragm need not be the same as the valve plate 112, but should provide sufficient deflection of the valve plate 112 for expected operating conditions of the power generator 100.

The fuel 130 may be formed in a pellet with multiple levels corresponding to the area of the container without the recess, and the area with the recess. In one embodiment, the fuel 130 is a pressed pellet utilizing LiAlH4 as the fuel. In further embodiments, one or more pellets may be used having a metal hydride, or combination of areas of metal hydride and chemical hydride to supply higher rates of hydrogen during pulse power demand. Many different types of metal and chemical hydrides to provide hydrogen in response to water vapor may be used in further embodiments. One or more diffusion channels 131 may be provided in the fuel pellet in ensure penetration of water vapor and utilization of a higher percentage of the fuel over the life of the power generator. The channels also allow the fuel pellet to expand without adversely deforming container 110, and may be selected to be just wide enough for such expansion to optimize the volume of fuel that may be provided within a desired form factor. In one embodiment, channel 131 is an annular channel. Further channels or holes may be provided in various patterns through one or more fuel pellets to optimize water vapor penetration.

In one embodiment, fuel cap 124 contains openings allowing water vapor and hydrogen to pass through. The openings are located within a radius of the valve seat 128. A membrane 143, such as a Gore-Tex® membrane may be disposed over the openings to serve as a particulate filter and a hydrogen and water vapor permeable, liquid water impermeable barrier to prevent water in liquid form from reaching the fuel. The fuel cap 124 has an opening for the valve stem assembly 132.

In one embodiment, the valve stem assembly 134 includes an annulus 146 disposed between the valve plate 112 and the diaphragm 136. The annulus 146 may be cylindrical with internal threads on each end to mate with fasteners, such as screws 148, 150 for coupling the valve plate 112 and diaphragm 136 respectively to the annulus 146. In one embodiment, the head of the screw 150 may be reduced in height such that it is approximately $1/16^{th}$ of an inch to provide more clearance for movement of the diaphragm without the screw 150 head moving outside the bottom of diaphragm support 138. In one embodiment, the screws have approximately 160 threads per inch. The screw 150 creates a gas seal about the diaphragm 136 and annulus 146 in one embodiment.

The use of the annulus 146 and fasteners 148, 150 provides flexibility in manufacturing, as either end may be assembled first. Opening 142 also provides access to fastener 150, allowing the flexibility of fastening the diaphragm 136 to the valve stem assembly 132 when desired. Other types of fasteners, such as snap fit fasteners may also be used with suitable modifications to the annulus 146 to mate with such snap fit fasteners 148, 150.

In one embodiment, fuel cell 114 is formed as a fuel cell stack having multiple layers, including a cathode electrode layer that is disposed proximate, yet insulated from the anode cap 118. Anode cap 118 has openings therein to allow oxygen to contact the cathode electrode layer, which as illustrated at 122, has an electrically conducting tab extending down to contact the fuel cap 124.

In one embodiment, the fuel cell 114 contains the following layers extending downward toward the fuel container in this embodiment. A 1 mil EPTFE (expanded polytetrafluoroethylene) membrane, a 1 mil adhesive, 4 mil adhesive and gas diffusion layer, Gore MEA (membrane electrode assembly), 4 mil adhesive and gas diffusion layer and 2 mil Kapton® layer. This is followed by an optional porous compliant material indicated at 152 to help keep the fuel cell in place. An open gap 153 may be filled with epoxy or other material if desired.

In one embodiment, the EPTFE membrane may be used to prevent shorting problems between the gas diffusion layer and anode cap 118. The membrane may be a dielectric gas permeable membrane that prevents shorts between anode cap 118 and the fuel cell stack. The next adhesive layer is a double sided adhesive, such as a Kapton® membrane with adhesive on both sides to hold adjacent layers of the fuel cell stack together and provide a gas seal. The next Kapton layer serves as the cathode electrode. The layer has a gold surface with laser cut through holes patterned on it. Further detail is provided in the following figures. The adhesive and gas diffusion layer is like a frame of adhesive with inside regions cut out to expose the fuel cell membrane to gas. The fuel cell membrane may be a Gore MEA (membrane electrode assembly) that serves as the active fuel cell membrane for the power generator 100. The following adhesive and gas diffusion layer and 2 mil Kapton® layer are also patterned with gold, forming the anode electrode.

As shown in FIGS. 1 and 2, the anode electrode cap 118 contains two annular ring posts 154, 156 defining an annular opening for the fuel cell 114. An outside annular post 158 forms an opening for mating with the insulative insert 126, and also defines the outer diameter of the anode. The fuel cap 124 contains an annular portion 160 that mates with a top outside portion of the fuel container 110 which may contain a chamfered edge 161 to provide for self alignment. The mating provides a gas seal by use of epoxy, laser weld or other connection method. Similarly, sidewall 134 of container 110 may also have a chamfer to mate in a self aligning manner with an internal annular edge 161 of the fuel cap 124.

Figure 3A:
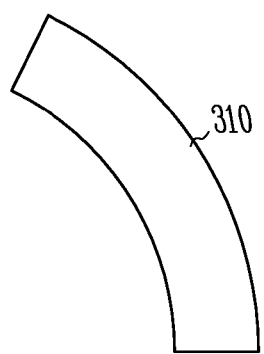
FIG. 3A is a top view of a segment of a fuel cell membrane pattern according to an example embodiment.
Figure 3B:
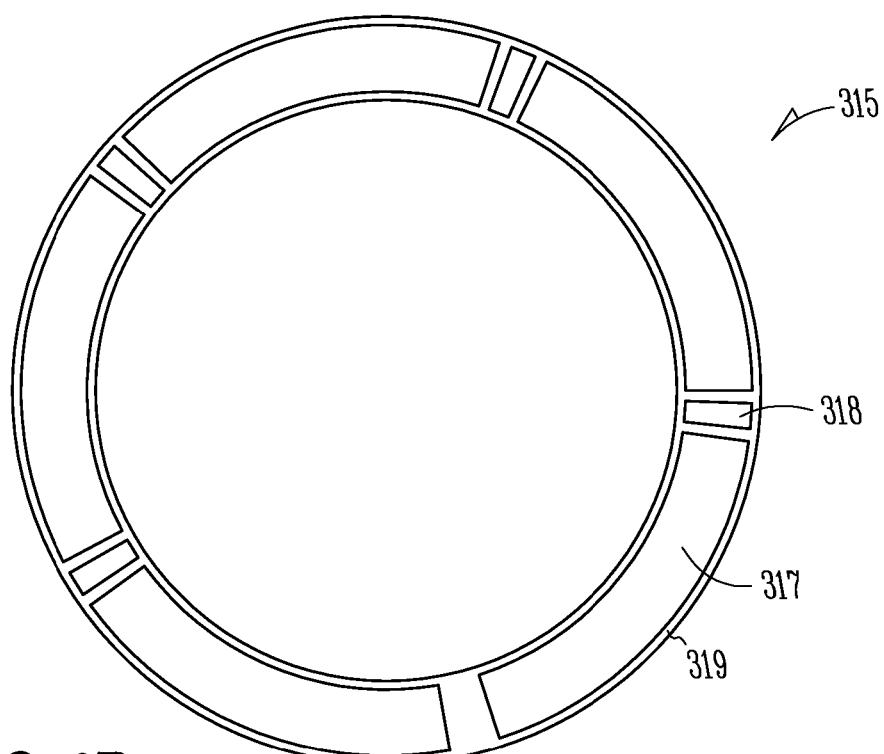
FIG. 3B is a top view of a ring shaped adhesive pattern according to an example embodiment.

FIGS. 3A, 3B, 3C, 3D, 3E and 3F are top views of various components that may be assembled to form the fuel cell 114 stack. FIG. 3A illustrates a membrane pattern 310 that may be duplicated such that five of them in one embodiment are disposed in a ring pattern in the stack. A ring shaped adhesive pattern is shown at 315 in FIG. 3B. Adhesive free areas 317 are shown and are generally of the same shape as membrane patters 310. A conductive layer 318 is disposed between the adhesive free areas, and may be formed of a conductor, such as gold. Conductive layer 318 allows sections of the fuel cell to be electrically serially connected. Adhesive 319 is disposed on both sides of the adhesive pattern in the remaining portions of pattern 315.

Figure 3C:
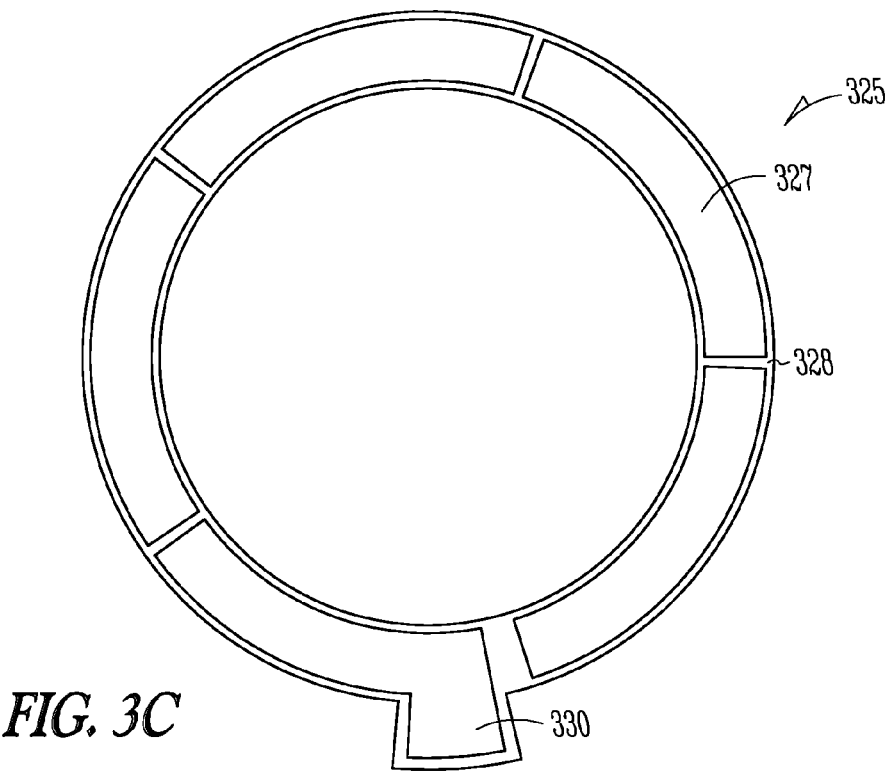
FIG. 3C is a top view of a cathode metallization pattern according to an example embodiment.
Figure 3D:
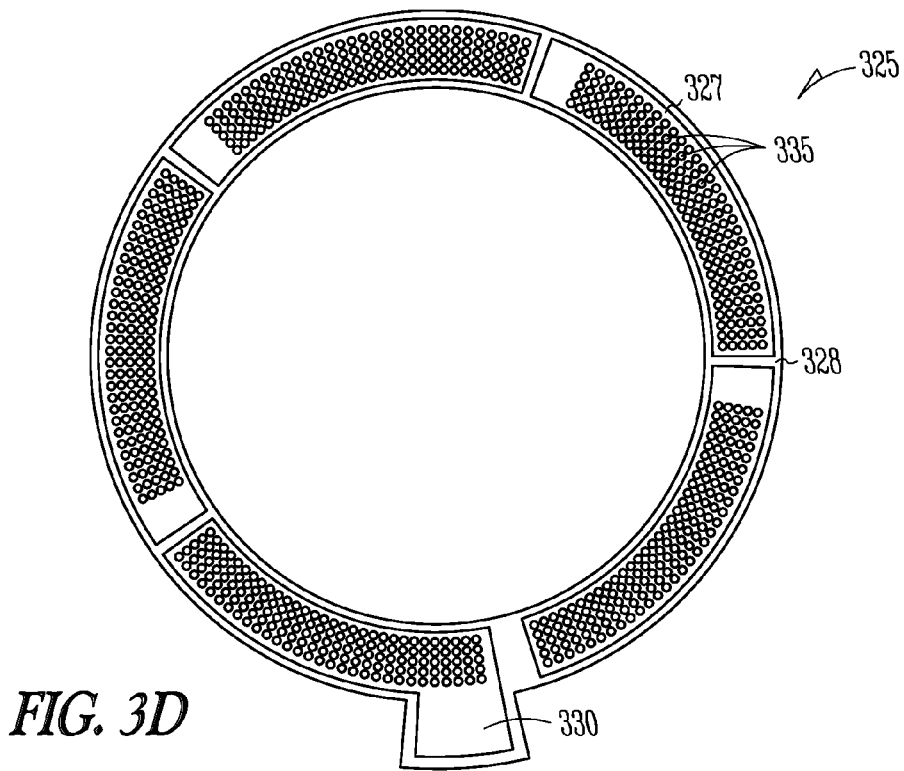
FIG. 3D is a top view of a finished cathode electrode that includes multiple sections for contacting multiple fuel cell membrane segments according to an example embodiment.

FIG. 3C illustrates a cathode metallization pattern 325. Segmented metal areas 327 corresponding to the membrane pattern 310 are formed, along with metal free areas 328. A tab 330, corresponding to tab 122 in FIGS. 1 and 2, is also formed with metal coating to provide the cathode tab for connection to an external cathode for the power generator 100. FIG. 3D illustrates a finished cathode electrode that includes five sections for contacting 5 fuel cell membranes. The sections have holes 335 cut through the segmented metal areas 327 to allow gas diffusion to and from the fuel cell membrane.

Figure 3E:
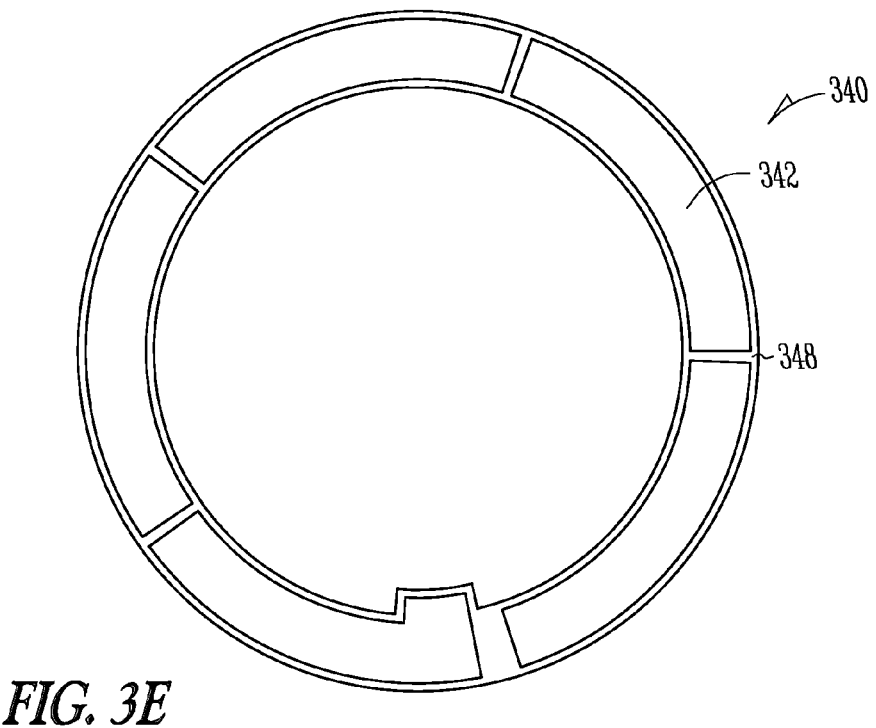
FIG. 3E is a top view of an anode metallization pattern used to form an anode electrode according to an example embodiment.
Figure 3F:
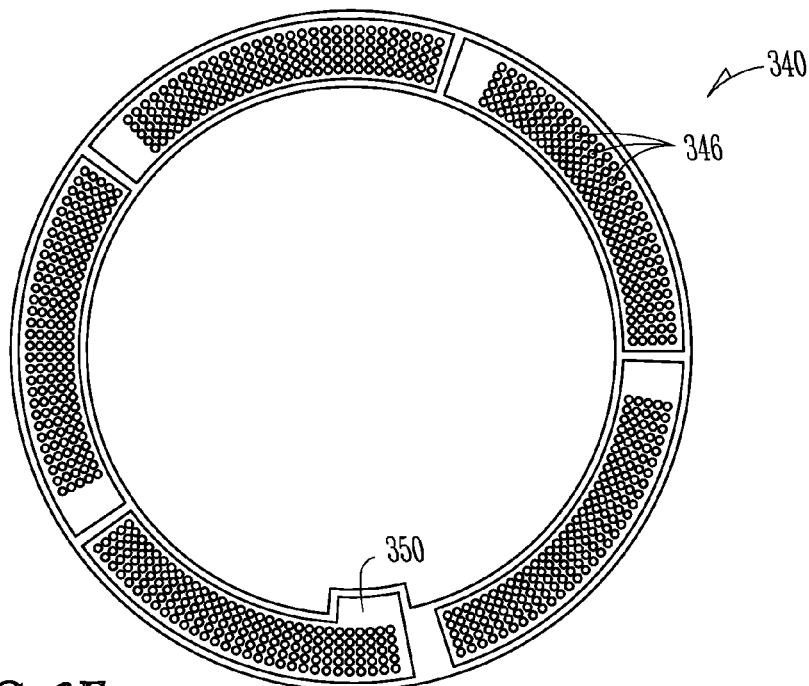
FIG. 3F is a top view of an anode electrode formed from the pattern of FIG. 3E.

FIGS. 3E and 3F show an anode metallization pattern 340 used to form anode electrode 345 respectively. Metallized segments 342 are formed with holes 346. Non metal areas 348 are also indicated. An anode electrode tab 350, corresponding to tab 120 in FIGS. 1 and 2, is also formed and used to provide a connection to an external anode for the power generator 100.

Figure 4:
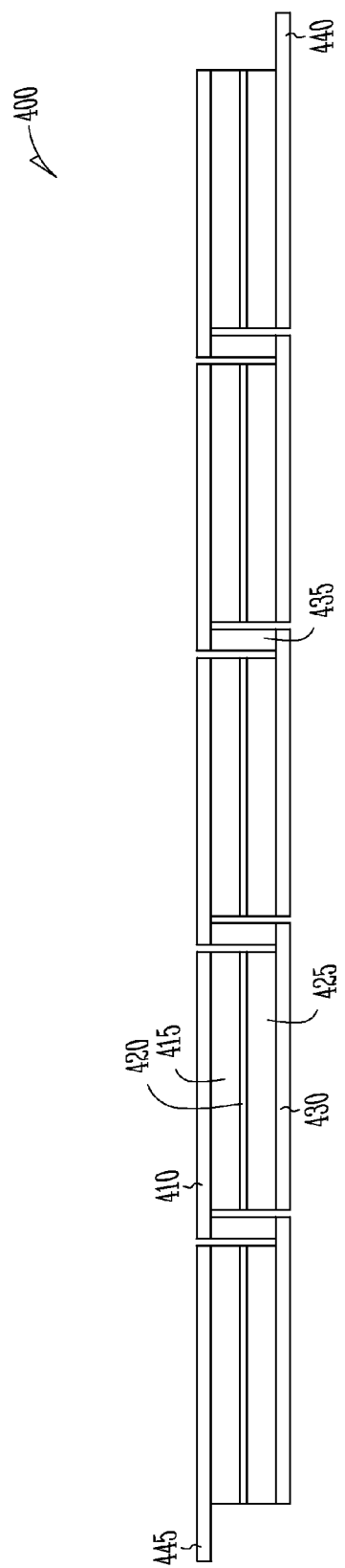
FIG. 4 is a cross sectional block schematic diagram illustrating electrical connections between segments of fuel cell stacks according to an example embodiment.

FIG. 4 is a cross sectional block schematic diagram illustrating electrical connections between segments of fuel cell stacks indicated generally at 400. Five segments of fuel cell stacks are illustrated, each having a cathode electrode 410, first adhesive and gas diffusion layer 415, membrane electrode assembly 420, second adhesive and gas diffusion layer 425 and anode electrode 430. Conductive tabs 435, such as gold tabs, are provided between the segments, and provide a series electrical connection between stacks, connecting an anode of one stack to a cathode of the next stack. An anode electrode output tab 440, corresponding to tab 120 in FIGS. 1 and 2, is coupled to the anode electrode 430 of one stack, and a cathode electrode output tab 445, corresponding to tab 122 in FIGS. 1 and 2, is coupled to the cathode electrode 410 of a stack at the other end of the series connected serial string of stacks.

In one embodiment, a method of manufacturing power generator 100 may be performed by separately building top (cover 115) and bottom (container 110) halves and creating an electrical coupling between them utilizing the anode and cathode tabs 120, 122. The fuel cell 114 may be assembled as part of the anode. Part of the valve assembly 132 is placed within the fuel cap 124 that has an integrated valve seat 128. The anode 118 and fuel cap 124 are then assembled with the "U" shaped electrical insulator 126 between them to electrically isolate anode and cathode. The fuel pellet 130 is then inserted into the cathode/fuel container 110, and the diaphragm support 138 and diaphragm 136 are assembled into the fuel container recess 140 to maintain the CR2032 battery form factor or other desired form factor. After the fuel container bottom half 110 and top half 115 containing the fuel cell 114 and valve assembly 132 are assembled together, a final screw 150 or snap fit is used to secure the diaphragm 136 to the rest of the valve assembly 132 though the hole 142 in the bottom of the anode. Some of the assembly steps described herein may be performed in a different order than that presented. For instance, the fuel pellet may be inserted in the container 110 well before, during or after assembly of the top half of the fuel cell. In further embodiments, the anode 118 may be the last element coupled to the fuel cell, with screw 148 being attached just prior to coupling of the anode 118.

CONCLUSION

A hydrogen fuel cell based power generator has a self regulating valve assembly in a low height profile. A valve plate has a smaller border than the border of the power generator, with a fuel cell laterally disposed in a somewhat coplanar ring or other shape around the valve plate. A valve assembly diaphragm also has a smaller border, making room for a larger, multi-level shaped fuel pellets that partially surround the diaphragm. Both of these arrangements combine to provide sufficient valve movement within the form factor height limits, and also allow more fuel to be on board for a power generator with high energy content.

An annulus (threaded cylinder) may be used to which the valve plate and diaphragm are attached on opposite ends by fasteners, such as screws or snap fit members to clamp them in place. The annulus/fasteners provide a valve pin or stem function. The structure allows for manufacturability given the small form factor.

A method of manufacturing may be performed by separately building top and bottom halves and creating an electrical coupling between them. The fuel cell is assembled as part of the cathode, and part of the valve is positioned proximate a fuel cap that has an integrated valve seat. The cathode and fuel cap are then assembled with a "U" shaped electrical insulator between them to electrically isolate anode and cathode. The fuel pellet is then inserted into the anode/fuel container, and a diaphragm support and diaphragm are assembled into the fuel container to maintain the CR2032 form factor. After the fuel container bottom half and top half containing the fuel cell and valve parts are assembled together, a final fastener such as a screw or snap fit may be used to secure the diaphragm to the rest of the valve assembly though a hole in the bottom of the anode.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A device comprising:
an annulus having a first end and a second end;
a container adapted to hold a hydrogen producing fuel and having a cover;
a valve plate located above a portion of the container that holds the hydrogen producing fuel coupled to the first end of the annulus by a fastener,
wherein the valve plate is adapted to contact a valve seat under the cover of the hydrogen producing fuel container; and
a diaphragm located adjacent to the bottom of the portion of the container that holds the hydrogen producing fuel coupled to the second end of the annulus by another fastener, wherein the annulus extends through the portion of the container that holds the hydrogen producing fuel located above an opening formed by a diaphragm support and wherein the diaphragm moves the valve plate relative to the valve seat responsive to a difference in pressure across the diaphragm.

2. The device of claim 1 wherein the diaphragm support couples the diaphragm to a recess in the container to provide a gas seal.

3. The device of claim 2 wherein the diaphragm support forms the opening providing access to the fastener coupling the diaphragm to the second end of the annulus.

4. The device of claim 3 wherein the fasteners are screws and the first and second ends of the annulus have internal threads suitable for coupling with the screws.

5. The device of claim 4 wherein the screw coupling the diaphragm to the second end of the annulus has a height reduced such that it does not extend outside of the recess in the container as the diaphragm moves.

6. The device of claim 5 wherein the screws comprise heads shaved to minimize height.

7. The device of claim 2 wherein the diaphragm support and container are electrically coupled.

8. The device of claim 7 and further comprising an electrically conductive adhesive disposed between the diaphragm support and the container.

9. The device of claim 2 wherein the fastener coupling the diaphragm to the second end of the annulus has a height reduced such that it does not extend outside of the recess in the container as the diaphragm moves.

10. The device of claim 1 wherein the annulus is formed of stainless steel 316.

11. The device of claim 1 wherein the valve plate further comprises a layer of material disposed on a surface of the valve plate that contacts the valve seat to prevent stiction and provide a seal.

12. A valve assembly for a proton exchange membrane fuel cell based power generator, the valve assembly comprising:
  an annulus having a first end and a second end;
  a container adapted to hold a hydrogen producing fuel and having a cover;
  a valve plate located above a portion of the container that holds the hydrogen producing fuel coupled to the first end of the annulus by a fastener, wherein the valve plate is adapted to contact a valve seat under the container cover, and wherein the valve plate has a border smaller than a border of the container cover to provide coplanar space for a fuel cell within the container cover;
  a diaphragm located adjacent to the bottom of the portion of the container that holds the hydrogen producing fuel coupled to the second end of the annulus by another fastener, wherein the annulus extends through the portion of the container that holds the hydrogen producing fuel located above an opening formed by a diaphragm support and wherein the diaphragm moves the valve plate relative to the valve seat responsive to a difference in pressure across the diaphragm; and
  the diaphragm support couples the diaphragm to a recess in the container to provide a gas seal, wherein the recess has a border that fits within a border of the container to enable extra fuel to be contained by the container.

13. The device of claim 12 wherein the diaphragm support forms the opening providing access to the fastener coupling the diaphragm to the second end of the annulus.

14. The device of claim 13 wherein the fasteners are screws and the first and second ends of the annulus have internal threads suitable for coupling with the screws and wherein the screw coupling the diaphragm to the second end of the annulus has a height reduced such that it does not extend outside of the recess in the container as the diaphragm moves.

15. The device of claim 12 wherein the fastener coupling the diaphragm to the second end of the annulus has a height reduced such that it does not extend outside of the recess in the container as the diaphragm moves.

16. The device of claim 12 wherein the valve plate further comprises a layer of material disposed on a surface of the valve plate that contacts the valve seat to prevent stiction and provide a seal.

17. A method comprising:
  coupling a valve plate located above a portion of a container adapted to hold a hydrogen producing fuel to a first end of an annulus by a fastener, wherein the valve plate is adapted to contact a valve seat under a container cover;
  coupling a diaphragm located adjacent to the bottom of the portion of the container that holds the hydrogen producing fuel to a second end of the annulus by another fastener, wherein the annulus extends through the portion of the container that holds the hydrogen producing fuel located above an opening formed by a diaphragm support and wherein the diaphragm moves the valve plate relative to the valve seat responsive to a difference in pressure across the diaphragm; and
  clamping the diaphragm to a recess in the container to provide a gas seal.

18. The method of claim 17 wherein the diaphragm is clamped using a diaphragm support having the opening providing access to the fastener coupling the diaphragm to the second end of the annulus.

19. The method of claim 18 wherein the fasteners are screws and the first and second ends of the annulus have internal threads suitable for coupling with the screws, and wherein the screw coupling the diaphragm to the second end of the annulus has a height reduced such that it does not extend outside of the recess in the container as the diaphragm moves.

20. The method of claim 18 wherein the diaphragm support and container are electrically coupled.

* * * * *